(12) United States Patent
Vodopyanov et al.

(10) Patent No.: US 8,384,990 B2
(45) Date of Patent: Feb. 26, 2013

(54) INFRARED FREQUENCY COMB METHODS, ARRANGEMENTS AND APPLICATIONS

(75) Inventors: Konstantin L. Vodopyanov, San Jose, CA (US); Samuel T. Wong, Lexington, MA (US); Robert L. Byer, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 230 days.

(21) Appl. No.: 12/855,397

(22) Filed: Aug. 12, 2010

(65) Prior Publication Data

US 2011/0058248 A1    Mar. 10, 2011

Related U.S. Application Data

(60) Provisional application No. 61/233,367, filed on Aug. 12, 2009.

(51) Int. Cl.
*G02F 2/02* (2006.01)
(52) U.S. Cl. ........................................ 359/330
(58) Field of Classification Search .................... 359/330
See application file for complete search history.

(56) References Cited

U.S. PATENT DOCUMENTS

| | | | |
|---|---|---|---|
| 5,748,309 A | 5/1998 | van der Weide et al. | |
| 5,835,642 A | 11/1998 | Gelikonov et al. | |
| 6,975,402 B2 * | 12/2005 | Bisson et al. | 356/432 |
| 7,620,077 B2 * | 11/2009 | Henderson | 372/6 |
| 2008/0037595 A1 * | 2/2008 | Gankkhanov et al. | 372/3 |
| 2008/0055702 A1 * | 3/2008 | Ferrari | 359/279 |
| 2010/0321767 A1 * | 12/2010 | Borguet et al. | 359/330 |
| 2011/0180729 A1 * | 7/2011 | Kafka et al. | 250/492.1 |
| 2011/0273763 A1 * | 11/2011 | Kaertner et al. | 359/330 |

OTHER PUBLICATIONS

Wong et al. "Self-phase-locked divide-by-2 optical parametric oscillator as a broadband frequency comb source." J. Opt. Soc Am. B, vol. 27, No. 5, pp. 876-882 (May 2010).
K. Vodopyanov et al. "More than 10000-nm-wide Mid-IR Frequency Comb Based on Divide-by-2 Optical Parametric Oscillator." Optical Society of America/CLEO/QELS, 3 pgs (May 16, 2010).
T. Udem et al. "Optical frequency metrology." Nature, vol. 416, pp. 233-237 (Mar. 14, 2002).
M. Thorpe et al. "Cavity-enhanced optical frequency comb spectroscopy: application to human breath analysis." Optics Express, vol. 16, Issue 4, pp. 2387-2397 (2008).
P. Gross et al. "Stability analysis of the self-phase-locked-by-2 divider optical parametric oscillator." Phys. Rev. A, 71, 033801 (Mar. 4, 2005), 15 pgs.
F. Adler et al. "Mid-Infrared Frequency Comb Fourier Transform Spectrometer." Opt. Express, vol. 18 (2010) pp. 21861-21872.
S. Wong et al. "Self-phase-locked degenerate femtosecond optical parametric oscillator." Optics Letters, vol. 33, No. 16 (Aug. 15, 2008), pp. 1896-1898.

* cited by examiner

*Primary Examiner* — Hemang Sanghavi
(74) *Attorney, Agent, or Firm* — Crawford Maunu PLLC

(57) ABSTRACT

Certain embodiments relate to and involve producing broadband phase-locked frequency combs in the near-infrared and mid-infrared spectral ranges. One such embodiment is directed to a system, with a pump laser and an optical parametric oscillator (OPO) resonator, that is configured to produce broad-bandwidth frequency combs in the near-infrared and mid-infrared frequency ranges. The pump laser is configured to produce femtosecond pulses of light having a pulse repetition rate. The optical parametric oscillator (OPO) resonator that is coupled to the pump laser for facilitating synchronous OPO pumping by matching a roundtrip time of the pulses of light within the OPO resonator with the pulse repetition rate of the pump laser. Among other more specific aspects, the OPO resonator can include a nonlinear optical gain element to provide broad-bandwidth parametric amplification, and optical elements to direct the pulses of light from the femtosecond laser to the nonlinear gain element and to direct subharmonic frequencies of the light out of the optical cavity.

24 Claims, 13 Drawing Sheets

INFRARED FREQUENCY COMB METHODS, ARRANGEMENTS AND APPLICATIONS

RELATED PATENT DOCUMENTS

This patent document claims the benefit, under 35 U.S.C. §119(e), of U.S. Provisional Patent Application Ser. No. 61/233,367 filed on Aug. 12, 2009, and entitled "Infrared Frequency Comb Methods, Arrangements and Applications;" this patent document and the Appendices A-B filed in the underlying provisional application are fully incorporated herein by reference.

BACKGROUND

Precision spectroscopic measurements can reveal a wealth of information about our surrounding world. With laser spectroscopy, one can perform measurements in the atmosphere that expose physical, chemical, and geological processes on Earth, detect trace amounts of hazardous gases, carry out medical breath analysis and even discover traces of life in the outer planets. Conventional methods of spectroscopy could either be ultrasensitive but limited in their range of molecules to be detected (e.g., narrow-bandwidth lasers), or broad-range but not sensitive enough (e.g., Fourier transform infrared spectrometers).

Precision frequency combs (that is a sequence of sharp peaks on the frequency scale) generated by mode-locked lasers in the visible, UV and near-infrared wavelength region have led to revolutionary advances in spectroscopy. Spectroscopic methods of detection based on frequency combs at longer wavelengths, which is near molecular vibrational 'fingerprint' resonances, can be exceedingly advantageous in terms of both high sensitivity and specificity.

Infrastructure protection against a terrorist-based weapons-of-mass-destruction (WMD) attack and cargo screening for possible hazards are among the many applications that provide examples of recent security challenges. For example, in the event of a hazardous agent's release, timely decision-making depends on sensitivity, reliability, and response time of an early warning system in place. Cargo screening at airports and seaports requires a standoff instrument for rapid, high-throughput scanning or real-time imaging of large surface areas that enhances security without delaying the flow of goods and passengers.

Precision frequency combs generated by mode-locked crystalline and fiber lasers can be useful for providing advances in spectroscopic detection of trace gases: several research groups have recently demonstrated high detection sensitivity, ability to identify and distinguish simultaneously a number of analytes and real-time information processing.

SUMMARY

Aspects of the present disclosure are directed to overcoming the above-mentioned challenges and others related to the types of applications discussed above and in other applications. These and various other aspects of the present disclosure are exemplified in a number of illustrated implementations and applications, some of which are shown in the figures and characterized in the claims section that follows.

Embodiments of the present disclosure relate to a system for producing ultra-broadband phase-locked frequency combs in the near-infrared and mid-infrared spectral ranges. The system is based on a degenerate frequency-divide-by-2 optical parametric oscillator that automatically locks the phases of its longitudinal optical modes to those of a pump laser. The pump laser produces femtosecond pulses. A cavity of the optical parametric oscillator is coupled to the laser and contains a short (10-500 microns) nonlinear optical gain element that is configured to provide broadband output. When pumped at 1560 nm wavelength, such a system is configured to provide an octave-wide (2.5-5 microns) frequency comb which is phase-locked to the pump. In an a cascaded embodiment, the output of the first optical parametric oscillator serves as a pump for the second optical parametric oscillator, and a frequency comb with much broader bandwidth (2.5-10 microns) is generated.

Embodiments of the present disclosure are directed towards an apparatus, system or device for producing broad-bandwidth frequency combs in the near-infrared and mid-infrared frequency ranges. The apparatus includes a pump laser configured to produce femtosecond pulses of light having a pulse repetition rate. An optical parametric oscillator (OPO) resonator is coupled to the pump laser and has a length configured to facilitate synchronous OPO pumping by matching a roundtrip time of the pulses of light within the OPO resonator with the pulse repetition rate of the pump laser. The OPO resonator includes a nonlinear optical gain element inside the OPO resonator, the nonlinear optical gain element configured to provide broad-bandwidth parametric amplification; and a set of optical elements configured to direct the pulses of light from the femtosecond laser to the nonlinear gain element and to direct subharmonic frequencies of the light out of the optical cavity.

Aspects of the present disclosure are directed toward the above-mentioned applications, among others, and can be particularly useful for use with devices that provide high performance metrics, such as (1) real-time operation; (2) high sensitivity; (3) high specificity, i.e., significantly reduced false-positive rate; (4) ability to identify multiple threats simultaneously; and (5) standoff spectral and imaging modes of operation. Other aspects are used together to address issues such as, low sensitivity and/or low selectivity, slow response time, collateral radiation dosage, and the use of complex, bulky equipment.

Consistent with one embodiment of the present disclosure, a method relates to the use of a phase-locked frequency comb source device having a pump laser. Using the pump laser, femtosecond pulses of light having a pulse repetition rate are produced. Broad-bandwidth parametric amplification is provided by directing the femtosecond pulses of light to a nonlinear optical gain element that is within an optical parametric oscillator (OPO) resonator. The femtosecond pulses of light are directed within light in the OPO resonator, using a set of optical elements, to match a roundtrip time of the pulses of light within the OPO resonator and the pulse repetition rate of the pump laser. Using the set of optical elements, subharmonic frequencies of the pulses of light are directed out of the optical cavity.

Embodiments of the present disclosure relate to a phase-locked frequency comb source device that includes a femtosecond laser producing pulses of light. An optical cavity or optical resonator is optically coupled to the laser and configured to provide type 0 or type I phase matching. The optical cavity includes a nonlinear optical gain element and an optical arrangement configured to direct the pulses of light from the femtosecond laser to the nonlinear gain element and to direct subharmonic frequencies of the light out of the optical cavity.

Consistent with another embodiment of the present disclosure, a method involves the use of a phase-locked frequency comb source device having a femtosecond laser. Pulses of light are produced from the femtosecond laser. The pulses of light are optically guided and controlled by providing a stage of nonlinear optical gain, and directing the pulses of light from the femtosecond laser to the nonlinear gain stage and therefrom directing subharmonic frequencies of the light.

Consistent with another embodiment of the present disclosure, a phase-locked frequency comb source device is manufactured. The device includes a femtosecond laser producing pulses of light and an optical cavity that is optically coupled to the laser and configured to provide type 0 or type I phase matching. The optical cavity includes a nonlinear optical gain element and an optical arrangement configured to direct the pulses of light from the femtosecond laser to the nonlinear gain element and to direct subharmonic frequencies of the light out of the optical cavity.

The above summary is not intended to describe each illustrated embodiment or every implementation of the present disclosure.

BRIEF DESCRIPTION OF FIGURES

The aspects of the present disclosure may be more completely understood in consideration of the detailed description of various embodiments of the disclosure that follows in connection with the accompanying drawings as follows.

Figure 1A:
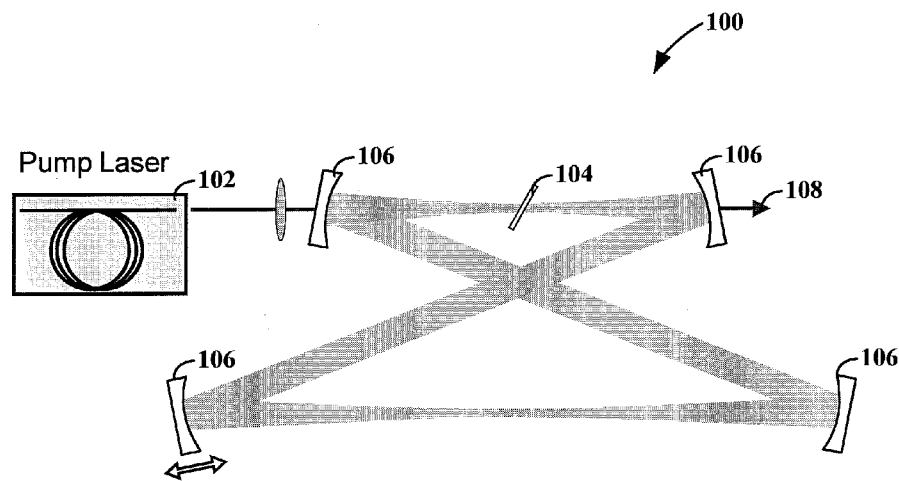
FIG. 1(a) depicts a system using an optical parametric oscillator, consistent with an embodiment of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure are believed to be useful for providing optical frequency combs operating in the infrared range. Some embodiments are directed toward synchronous OPOs that operate at degeneracy. Specific applications of the present disclosure facilitate octave-wide frequency combs that use type 0 or type I phase matching. While the present disclosure is not necessarily limited to such applications, various aspects of the disclosure may be appreciated through a discussion of various examples using this context.

According to certain embodiments, the present disclosure is directed to approaches for a wide variety of structures, devices and methods including, but not limited to, mid-range infrared (IR) frequency comb generators as might be used in connection with the above-mentioned applications. Other aspects of the present disclosure are directed to approaches for overcoming performance-related limitations of such structures. In certain more specific aspects, the present disclosure is directed to improving the performance of mid-range infrared (IR) frequency comb generators while overcoming performance-related limitations of mid-range infrared (IR) frequency comb generators.

As an example, one aspect of the present disclosure concerns an approach for generating frequency combs, targeting mid-infrared region. The frequency combs in this region can be particularly useful for use in detecting molecular signatures for most atmospheric organics, volatiles, and isotopes. Particular implementations relate to a broad-bandwidth frequency comb source that uses a mid-IR frequency emitter and is based on a degenerate synchronously-pumped optical parametric oscillator (OPO). Various applications of mid-infrared frequency combs include astronomical observations, ultra-sensitive molecular spectroscopy based on both parallel spectral detection, and coherent multi-heterodyne Fourier transform spectroscopy.

Extension of the range of phase-stabilized few-optical cycle pulses to longer wavelengths is particularly useful for applications such as molecular spectroscopy and trace gas detection. For instance, such an extension in wavelengths can be useful for reaching the range of frequency combs corresponding to fundamental rotational-vibrational resonances. Other embodiments relate to high harmonic generation in gases due to the ability of longer wavelengths to achieve longer acceleration cycle for an electron escaping the atom. Still other embodiments relate to vacuum-based laser-driven particle acceleration using photonic crystal structures, because longer wavelengths can be useful for avoiding two-photon absorption in the latter.

Particular aspects of the present disclosure relate to a frequency comb in a molecular fingerprint range that is particularly well suited for spectroscopy, metrology, medical breath analysis or detection of hazardous materials. One embodiment uses a frequency comb to perform interferometric spectroscopy and provides a fast (sub-ms) acquisition time.

Embodiments of the present disclosure include methods and devices that can detect explosives and their explosive components. Non-limiting examples of detectable materials include Trinitrotoluene (TNT), Cyclotrimethylenetrinitramine (RDX), Pentaerythritol tetranitrate (PETN) or Acetone peroxide (TATP) as well as chemical warfare agents (CWAs) (e.g., Sarin, VX, Soman or Tabun), multiple Toxic Industrial Chemicals (TICs), organics and others.

Particular implementations provide high detection fidelity because of an extremely broad spectral coverage of two octaves. The spectral range covered is significantly broad to allow positive identification of an explosive chemical by matching a detected spectrum with a library spectrum. The available detection spectral span is 3000 cm−1, thereby obviating the effect of interferents associated with limited-width detection, essentially reducing the probability of false identification. Consistent with one embodiment of the present disclosure, a detection device is provided that operates in the wavelength region greater than 2.5 μm.

One embodiment of the present disclosure relates to a pump source that uses a mode locked fiber laser with stable and maintenance-free operation for many years. Such a pump source can be part of a robust sensor that operates in non-laboratory environments. In certain implementations, the detector is packaged into a compact, low-cost device that exhibits low power consumption (e.g., less than about 100 W). The device can operate without other consumables requiring replacement and also autonomously using electronic control circuitry.

FIG. 1(a) depicts a system using an optical parametric oscillator, consistent with an embodiment of the present disclosure. Consistent with one embodiment of the present disclosure, a method relates to the use of a phase-locked frequency comb source device 100 having a pump laser 102. Using the pump laser 102, femtosecond pulses of light having a pulse repetition rate are produced. Broad-bandwidth parametric amplification is provided by directing the femtosecond pulses of light to a nonlinear optical gain element 104 that is within an optical parametric oscillator (OPO) resonator. The femtosecond pulses of light are directed within light in the OPO resonator, using a set of optical elements 106, to match a roundtrip time of the pulses of light within the OPO resonator and the pulse repetition rate of the pump laser. Using the set of optical elements 106, subharmonic frequencies 108 of the pulses of light are directed out of the optical cavity.

Embodiments of the present disclosure are directed toward IR comb sources that use a degenerate synchronously-pumped OPO as a divide-by-2 subharmonic generator. The OPO includes a small (~1-mm-long) type-0 periodically-poled lithium niobate (PPLN) crystal as a nonlinear gain element and uses a femtosecond mode-locked laser at 775 nm as the pump. The comb source provides passive all-optical self-phase-locking between the pump and the subharmonic output in the form of a stable broadband frequency comb centered near 1550 nm (half of the pump frequency). In addition to transposing the pump frequency comb to the IR range, the comb spectrum is simultaneous broadened by 2.6 times. The spectral width is ~200 nm or 830 inverse cm and the phases of the subharmonic modes are phase locked to those of the pump laser. This shows that a frequency comb can be transposed to longer waves (to its subharmonic), and indicates that spectroscopically useful parts of the electromagnetic spectrum can be reached by starting with an appropriate pump wavelength.

Embodiments of the present disclosure are directed toward the use of a nonlinear optical gain element 102 that is designed to provide quasi phase matching. The gain element 102 can be implemented using various nonlinear optical crystals. A few non-limiting examples of oxide-based optical crystals include, a periodically-poled lithium niobate (PPLN) crystal, a periodically-poled lithium tantalate (PPLT) crystal, a periodically-poled potassium titanyl phosphate (PPKTP) crystal, a periodically-poled potassium titanyle arsenate (PPKTA) crystal, a periodically-poled rubidium titanyl phosphate (PPRTP) crystal or a periodically-poled rubidium titanyl arsenate (PPRTA) crystal.

Other embodiments of the present disclosure can be implemented with a nonlinear optical gain element 102 that provides quasi phase matching and is a semiconductor-based nonlinear optical crystal. A few non-limiting examples of semiconductor-based optical crystals include, a periodically-inverted gallium arsenide (GaAs) crystal, a periodically-inverted gallium nitride (GaN) crystal, a periodically-inverted gallium phosphide (GaP) crystal, a periodically-inverted zinc selenide (ZnSe) crystal, or a periodically-inverted zinc sulfide (ZnS) crystal.

Still other embodiments of the present disclosure can be implemented with a nonlinear optical gain element 102 that uses angle-tuned phase matching. A few non-limiting examples include a silver gallium sulphide (AGS) crystal, a silver gallium selenide (AGSe) crystal, a zinc germanium phosphide (ZGP) crystal, a gallium selenide (GaSe) crystal; cadmium germanium arsenide (CGA) crystal or cadmium silicon phosphide ($CdSiP_2$) crystal.

Particular embodiments of the present disclosure relate to the nonlinear optical gain element 102 that is configured to increase the optical parametric oscillator acceptance bandwidth near degeneracy and to reduce the effects of group velocity dispersion. In certain embodiments, the gain element is 10-500 microns in length.

In one embodiment of the present disclosure, the nonlinear optical gain element 102 has the length that is less than the phase matching coherence length. For instance, this length could be around 10-100 microns.

Various embodiments of the present disclosure are directed towards a nonlinear optical gain element configured with group velocity dispersion (GVD) that is minimal near the degeneracy wavelength (twice the pump wavelength). This can be particularly useful for increasing the optical parametric oscillator acceptance bandwidth.

Embodiments of the present disclosure are also directed towards compensating for the GVD inside the OPO cavity/resonator using, for example, prisms, and/or optical materials with the opposite sign of GVD and/or with special chirped mirrors.

Certain embodiments of the present disclosure include a piezoelectric device and an electronic servo loop for stabilizing the device in a doubly resonant condition. The piezoelectric device can be used to adjust the length of the OPO cavity/resonator.

Other embodiments of the present disclosure are directed towards the production of a phase-locked frequency comb spanning multiple ranges. One example set of ranges includes a frequency comb from 1.5 microns to 3 microns, from 2.5 microns to 5 microns, and from 3 microns to 6 microns. Another example set of ranges for a phase-locked frequency comb includes from 3 microns to 6 microns, from 5 microns to 10 microns, and from 6 microns to 12 microns.

Consistent with certain embodiments, a device can be configured to provide phase-locking between the modes of the femtosecond pump laser and the subharmonic frequencies of the light directed out of the optical cavity/resonator.

Still other embodiments provide all-optical self-phase-locking between the femtosecond laser and the subharmonic frequencies of the light directed out of the optical cavity.

Although not limited thereto, various embodiments can be configured for use as a solution for one or more of atmospheric measurement to expose physical, chemical and geological processes on Earth; medical breath analysis; detection of hazardous material; pollution monitoring and/or detection; atmospheric monitoring; and climate-change analysis.

Other embodiments of the present disclosure relate to such a frequency comb that is transposed to longer waves and to subharmonic thereof by starting with an appropriate pump wavelength. Such frequency comb sources include a ring-cavity OPO pumped by a femtosecond Er-fiber laser at ~1550 nm. The nonlinear gain element is a very thin (~0.1 mm) PPLN crystal. The short length of the PPLN can be particularly useful for the broadband OPO performance, e.g., due to (i) large parametric gain acceptance bandwidth and (ii) due to minimizing the influence of the group velocity dispersion (GVD). The two curved mirrors in the cavity help keep the eigenmode beamsize inside the PPLN crystal close to confocal with respect to the PPLN crystal. The OPO mirrors are designed to be reflective in the 2.5-5 micron range and transmissive for the 1550 nm pump wavelength. An intracavity element is used to compensate for first- and second-order group velocity dispersion (GVD). This intracavity element (e.g., ZnSe) is designed with the opposite sign of the first-order GVD and can also include special GVD compensating mirrors. A piezoelectric actuator stabilizes the OPO at the resonant condition by controlling the positioning of at least one of the mirrors.

Consistent with various embodiments of the present disclosure, the OPO source produces a phase-locked frequency comb between 4000 and 2000 inverse cm (2.5-5 microns), with limits being imposed by the ability to compensate GVD in PPLN. The proposed ultra broadband mid-IR source can be particularly useful as part of coherent frequency comb spectroscopy, which combines broad spectral bandwidth, high spectral resolution, precise frequency calibration, and ultra-high detection sensitivity in one platform.

Embodiments of the present disclosure relate to a device having a spectral range that can be extended to even longer wavelengths, such as 10 microns. The device uses a cascaded subharmonic OPO setup. The first OPO stage is similar to that described above. The output of this OPO, centered at 3.1 microns, serves as a pump for the second ring-cavity OPO based on a thin GaAs crystal (one coherence-length-thick, 0.08 mm) resulting in a frequency comb with the wavelength span of 5 to 10 microns.

A particular embodiment of the present disclosure is directed towards an approach to creating IR frequency combs by using either a type I (the signal and idler have the same polarization) or a type 0 phase-matched divide-by-2 OPO pumped by a femtosecond laser (type 0 OPO is a type I OPO with the pump, signal, and idler polarizations parallel). Aspects relating to a type 0 configuration can be particularly useful for their potential for high (>90%) conversion efficiency, e.g., because many of the pump photons are converted into signal/idler pairs. Other aspects of type 0 phase-matching can be particularly useful for providing a wide bandwidth near degeneracy and, in the case of lithium niobate, for exploitation of a high, or even the highest, available nonlinear coefficient ($d_{33}$). Other aspects relate to the realization that passive optical phase locking can be achieved without active electronic stabilization.

Embodiments of the present disclosure are discussed in terms of oscillation conditions for a degenerate synchronously pumped optical parametric oscillator (SPOPO), coupled nonlinear optical wave equations for self-phase-locking of the OPO modes to those of the pump, and the stability conditions of the phase-locked state. Without limitations and for assisting in the understanding of such aspects, the present disclosure includes a discussion of associated theories and related mathematical equations. Various experimental results related thereto are also discussed briefly, although the present disclosure is not necessarily limited by any specific theory or experimental result.

In an OPO, the photon energy conservation dictates that $$v_p = v_s + v_i \tag{1}$$

and, also, there is a fixed phase relationship between the pump, signal, and idler waves, $$\emptyset_p = \emptyset_s + \emptyset_i + \pi/2 \tag{2}$$

so that the energy flow is from the pump to the signal and the idler pair. Here $v_p$, $v_s$, and $v_i$ are the pump, signal, and idler frequencies, and $E_p = E_p \cos(2\pi v_p t + \emptyset_p)$, $E_s = E_s \cos(2\pi v_s t + \emptyset_s)$, $E_i = E_i \cos(2\pi v_i t + \emptyset_i)$, are the electric fields (E-fields) of the pump, signal, and idler, correspondingly. For a non-degenerate OPO, the signal and idler phases, $\emptyset_s$ and $\emptyset_i$, are free to adopt any value as long as Eq. (2) is satisfied. This degree of freedom disappears when the (co-polarized) signal and idler become indistinguishable at degeneracy, which leads to $\emptyset_s = \emptyset_i$. Hence, Eq. (2) becomes $$\emptyset_p = 2\emptyset_{s,i} + \pi/2 \tag{3}$$

and the phase coherence between the OPO and the pump is established. Note that when the signal and idler E-fields simultaneously change their phases by $\pi$ (flip sign), the total phase difference changes by $2\pi$, such that Eq. (3) still remains valid.

Figure 1B:
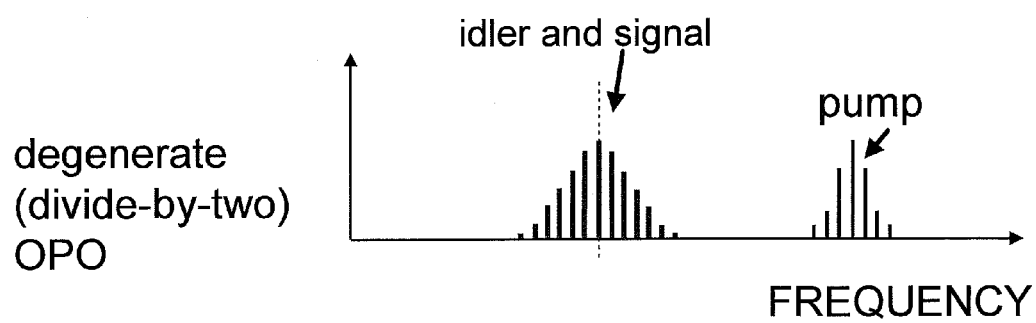
FIG. 1(b) depicts longitudinal modes of a degenerate synchronously pumped optical parametric oscillator (SPOPO), consistent with embodiments of the present disclosure.

The locking analysis for the degenerate SPOPO is a little more complicated than that for the CW OPO with a monochromatic pump due to the multi-axial-mode structure of the SPOPO. However, the main features remain the same. The pump field is represented by a frequency comb, $$v_n = f_{CEO} + n f_{rep}, \tag{4}$$

with mode separation $f_{rep}$ (FIG. 1(b)) corresponding to the pulse repetition rate, n as the mode number (centered at some large $n_0 = 10^6 - 10^7$), and $f_{CEO}$ as the carrier-envelope offset (CEO) frequency ($0 \leq f_{CEO} < f_{rep}$). FIG. 1(b) depicts a degenerate SPOPO, consistent with embodiments of the present disclosure. The dashed line corresponds to the half of the pump center frequency. In the particular embodiment shown in FIG. 1(b), the signal and the idler overlap near half of the pump center frequency, the OPO frequency comb is expressed as $$v_m = \frac{f_{CEO}}{2} + m f_{rep}, \tag{5}$$

$$v_m = \frac{f_{CEO}}{2} + \left(m + \frac{1}{2}\right) f_{rep}, \tag{6}$$

where m is the OPO mode number (centered around some $m_0$ which is the closest integer to $n_0/2$).

Figure 2:
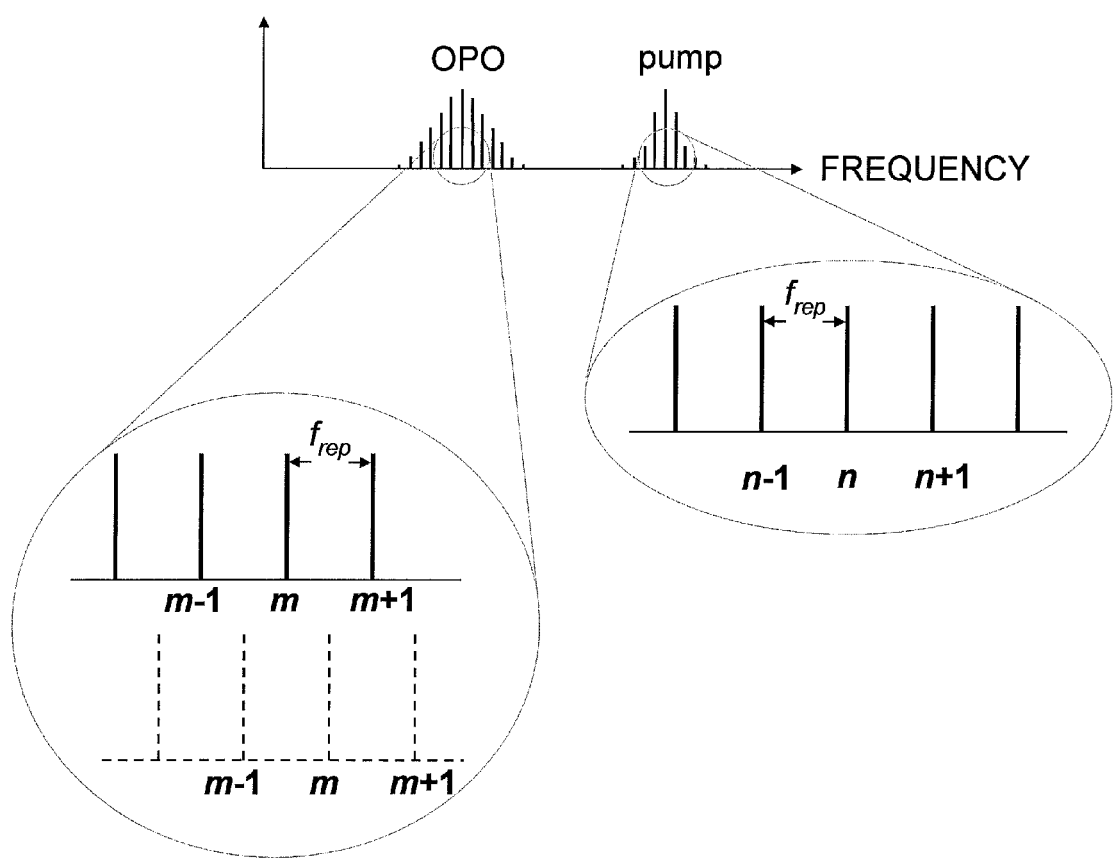
FIG. 2 illustrates positions of longitudinal modes of a degenerate SPOPO with respect to those of the pump, consistent with embodiments of the present disclosure.

FIG. 2 illustrates positions of longitudinal modes of a degenerate SPOPO with respect to those of the pump, consistent with embodiments of the present disclosure. The relations of the Eqs. (5) and (6) result (i) from the photon energy conservation if one regards, as an elementary act, a decay of a particular pump mode into a signal plus idler modes and (ii) from the fact that the frequency spacing between neighboring OPO longitudinal modes has to be the same as for the pump (per SPOPO condition). The distinction between Eqs. (5) and (6) comes from the fact that the OPO frequency grid $v_m$ can either correspond to one half of the frequencies of the even modes (4) of the pump laser $v_{2p}$ or odd modes $v_{2p+1}$, where p is an integer.

Figure 3:
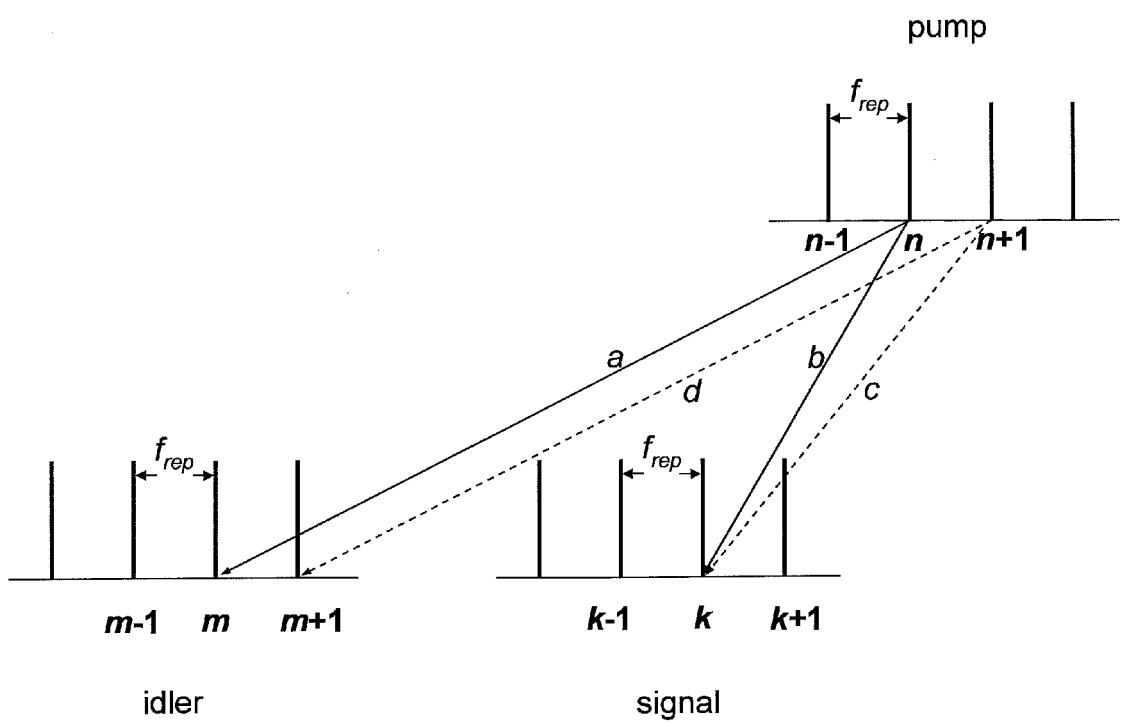
FIG. 3 shows that phase coherence between neighboring OPO modes is established via cross-coupling between the pump, signal, and idler, e.g., via abcd path, consistent with an embodiment of the present disclosure.

For a mode-locked pump laser, all its modes are in phase. For simplicity, these phases can be set to zero by an appropriate choice of time origin: $\varnothing_n=0$. In a non-degenerate OPO, constant phase relations will be established separately among the signal and idler modes. FIG. 3 shows that phase coherence between neighboring OPO modes is established via cross-coupling between the pump, signal, and idler, e.g., via abcd path, consistent with an embodiment of the present disclosure. Suppose that a pump mode number n (FIG. 3) decays into the idler mode number m and signal mode number k. If the phase of the mth idler mode is $\varnothing_m$, from Eq. (2) it follows that the phase of the signal mode k has to be $\varnothing_k=-\pi/2-\varnothing_m$. Now, if a laser mode number n+1 decays into the idler mode m+1 and signal mode k, the phase of the (m+1)th idler mode has to be $\varnothing_{m+1}=-\pi/2-\varnothing_k=-\pi/2-(-\pi/2-\varnothing_m)=\varnothing_m$. This mechanism locks the phases (via abcd path in FIG. 3) of neighboring idler modes and thus locks all idler modes. The same is true for the signal. In a degenerate OPO, the signal and the idler overlap. Because of the cross-coupling, a constant phase is established through the common set of signal-plus-idler modes, which become phase-locked to those of the pump, and relation (3) becomes $$\varnothing_n=2\varnothing_m+\pi/2 \quad (7)$$

Here the index m refers to the common signal-plus-idler set of OPO modes. Since $\varnothing_n$ is a constant, $\varnothing_m$ is also a constant and SPOPO modes become phase-coherent with those of the pump laser. In particular, when $\varnothing_n=0$, $\varnothing_m=-\pi/4$, or $\varnothing_m=-\pi/4+\pi=3\pi/4$.

Figure 4:
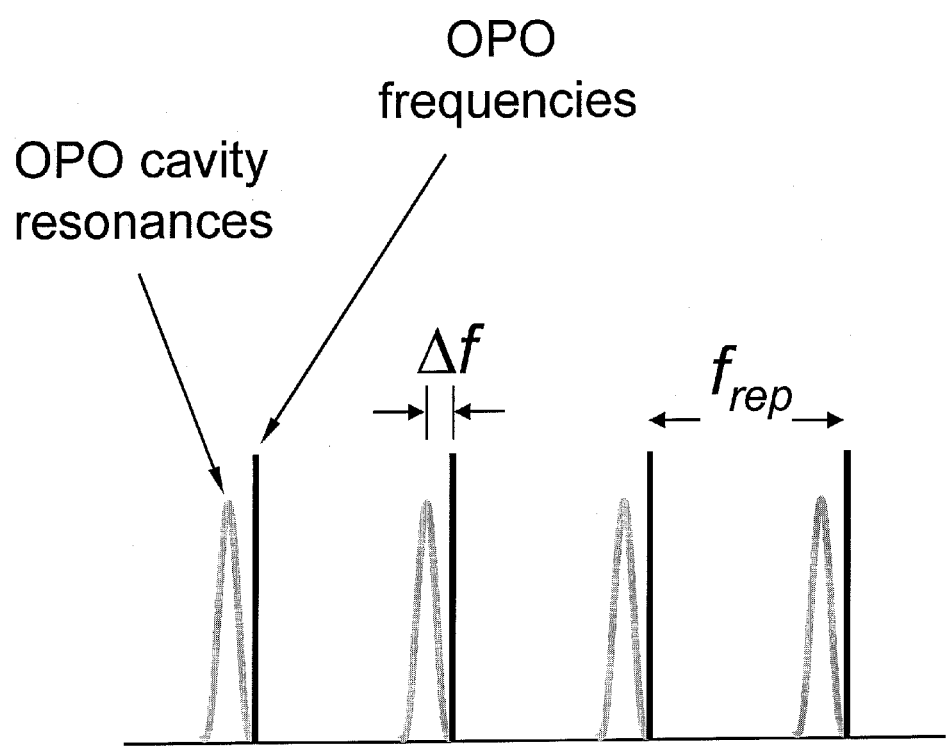
FIG. 4 depicts SPOPO cavity resonances and SPOPO frequencies in the degenerate phase-locked regime, consistent with an embodiment of the present disclosure.

FIG. 4 depicts SPOPO cavity resonances and SPOPO frequencies in the degenerate phase-locked regime, consistent with an embodiment of the present disclosure. In a doubly resonant OPO, both the signal and the idler frequencies coincide with the longitudinal modes (resonances) of the OPO cavity, which is achieved by fine tuning of the cavity length on a sub-wavelength scale. Because of external perturbations, the OPO resonances fluctuate in frequency by some value $\Delta f$, with respect to the grid of OPO frequencies (5) and (6) determined by the frequency grid of the pump laser (FIG. 4). This mismatch causes an additional round trip phase $\phi=2\pi\times\Delta f/f_{rep}$ (for both the signal and the idler).

For zero wave-vector mismatch, plane-wave approximation, and absence of pump depletion, the propagation of the normalized signal and idler E-fields, $A_s=(n_s/\omega s)^{1/2}E_s$ and $A_i=(n_i/\omega_i)^{1/2}E_i$, through the nonlinear crystal can be written in the matrix form, $$\begin{bmatrix} A_s(z=l) \\ A_i^*(z=l) \end{bmatrix} = \begin{bmatrix} \cosh(gl) & i\sinh(gl) \\ -i\sinh(gl) & \cosh(gl) \end{bmatrix} \begin{bmatrix} A_s(z=0) \\ A_i^*(z=0) \end{bmatrix}. \quad (8)$$

The asterisk denotes complex conjugate, $n_{s,i}$ and $\omega_{s,i}$ are the signal and idler refractive indices and angular frequencies correspondingly, l is the nonlinear crystal length, and g is the gain coefficient, which is proportional to the nonlinear optical coefficient $d_{eff}$ and to the pump field $E_p$.

Taking into account the intracavity loss, which is expressed through the roundtrip E-field transmission t (such that the fractional power loss per round trip is loss=1–$t^2$), and a round trip extra phase shift $\phi$, due to the cavity-length mismatch, the cavity round trip transfer matrix can be written as $$M = \begin{vmatrix} t & 0 \\ 0 & t \end{vmatrix} \begin{vmatrix} e^{i\varphi} & 0 \\ 0 & e^{-i\varphi} \end{vmatrix} \begin{vmatrix} \cosh(gl) & i\sinh(gl) \\ -i\sinh(gl) & \cosh(gl) \end{vmatrix} \quad (9)$$

$$= \begin{vmatrix} te^{i\varphi}\cosh(gl) & ite^{i\varphi}\sinh(gl) \\ -ite^{-i\varphi}\sinh(gl) & te^{-i\varphi}\cosh(gl) \end{vmatrix}.$$

From self-consistency, the following condition should be met:

$$A=MA, \quad (10)$$

and for a nontrivial solution:

$$det|M-I|=0, \quad (11)$$

where I is the unit matrix. From this the following relation is derived:

$$t^2-2t\cos h(gl)\cos\phi+1=0. \quad (12)$$

For the small loss in the cavity and for the small $\phi$, an approximation can be used: $\cos h(gl)\approx 1+(gl)^2/2$ and $\cos(\phi)\approx 1-\phi^2/2$. Taking into account that loss=1–$t^2$, obtains:

$$(gl)^2=(loss/2)^2+\phi^2. \quad (13)$$

Since the condition of the doubly resonant OPO threshold is $(gl)_0^2=(loss/2)^2$, the main result for the maximum allowed extra phase is obtained as, $$\varphi = (gl)_0\sqrt{N-1} = \frac{loss}{2}\sqrt{N-1}. \quad (14)$$

Accounting for $(gl)^2$ being proportional to the pump power and $N=(gl)^2/(gl)_0^2$ (the number of times above the oscillation threshold for the pump power), results in $$\frac{\Delta f}{f_{rep}} = \frac{\varphi}{2\pi} = \frac{loss}{4\pi}\sqrt{N-1}. \quad (15)$$

The self-phase-locked stability range $\Delta f$ increases with the pump power, and decreases with the cavity Q factor (defined in the usual way and related to the cavity loss factor defined above), at a fixed number of times above threshold.

Figure 5:
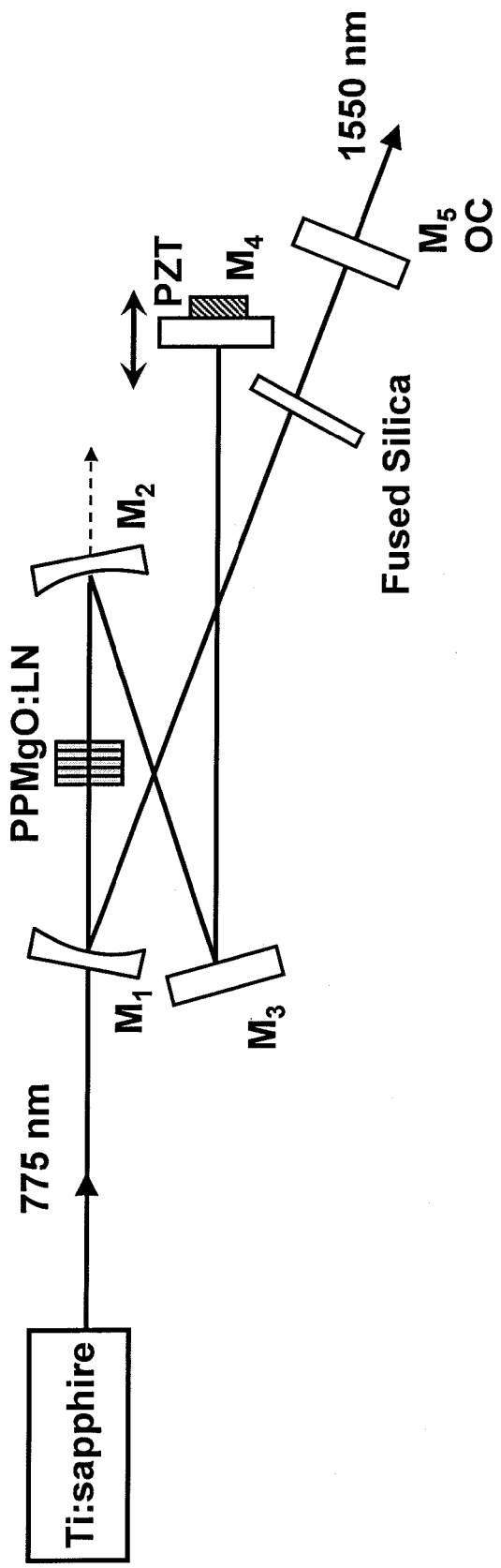
FIG. 5 shows that the SPOPO consisted of a near-symmetrically folded linear confocal cavity, consistent with an embodiment of the present disclosure.

FIG. 5 depicts a schematic diagram of an experimental degenerate type 0 SPOPO, consistent with an embodiment of the present disclosure. Mirrors M1-M4 are highly reflective at 1550 nm, and M5 is an output coupler (OC) mirror. The experimental SPOPO device was tested in a manner consistent with various aspects of the present disclosure. The SPOPO consisted of a near-symmetrically folded linear confocal cavity as shown in FIG. 5. A Ti:Sapphire mode-locked laser (180 fs pulses at 80 MHz) with the center wavelength of 775 nm was used as a pump. The nonlinear gain element was an antireflection-coated (at 775 and 1550 nm) 1 mm long periodically poled magnesium oxide-doped lithium niobate (PPMgO:LN) crystal (HC Photonics, Inc.) with the poling period of 18.92 μm, kept at t=140° C., and designed for type 0 (e-ee) phase-matched 1550 nm subharmonic generation. A 6 mm thick fused silica plate was placed inside the cavity to compensate the second-order dispersion of lithium niobate. The transition between degenerate and non-degenerate SPOPO operations was performed by changing the cavity length. The amount of detuning required to switch between these two states was about 5 μm.

Figure 6:
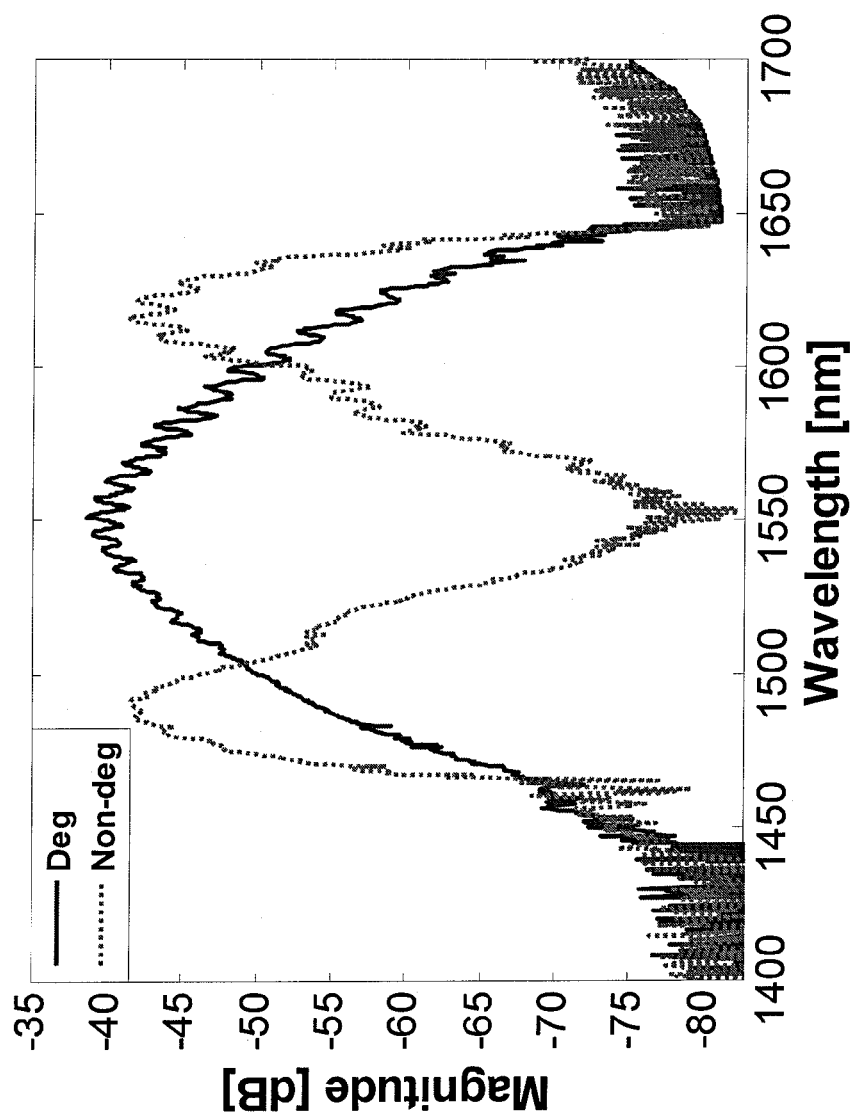
FIG. 6 compares the two spectra, for degenerate and non-degenerate SPOPO operations, obtained with an optical spectrum analyzer, consistent with an embodiment of the present disclosure.

FIG. 6 depicts a comparison of two spectra, for degenerate and non-degenerate SPOPO operations, obtained with an optical spectrum analyzer, consistent with an embodiment of the present disclosure. The 3 dB spectral bandwidth of the combined signal and idler at degenerate operation around 1550 nm was 50 nm (210 cm$^{-1}$). Taking into account that the pump laser bandwidth was 75 cm$^{-1}$, the degenerate SPOPO exhibited an output comb broadening by a factor of 2.6. The fringes in the degenerate SPOPO spectrum are related to the etalon effects from a glass slide used to out couple some optical power to measure the spectrum. These ripples consistently appear across all the measured spectra in this particular setup and they can be regarded as an experimental artifact.

Figure 7:
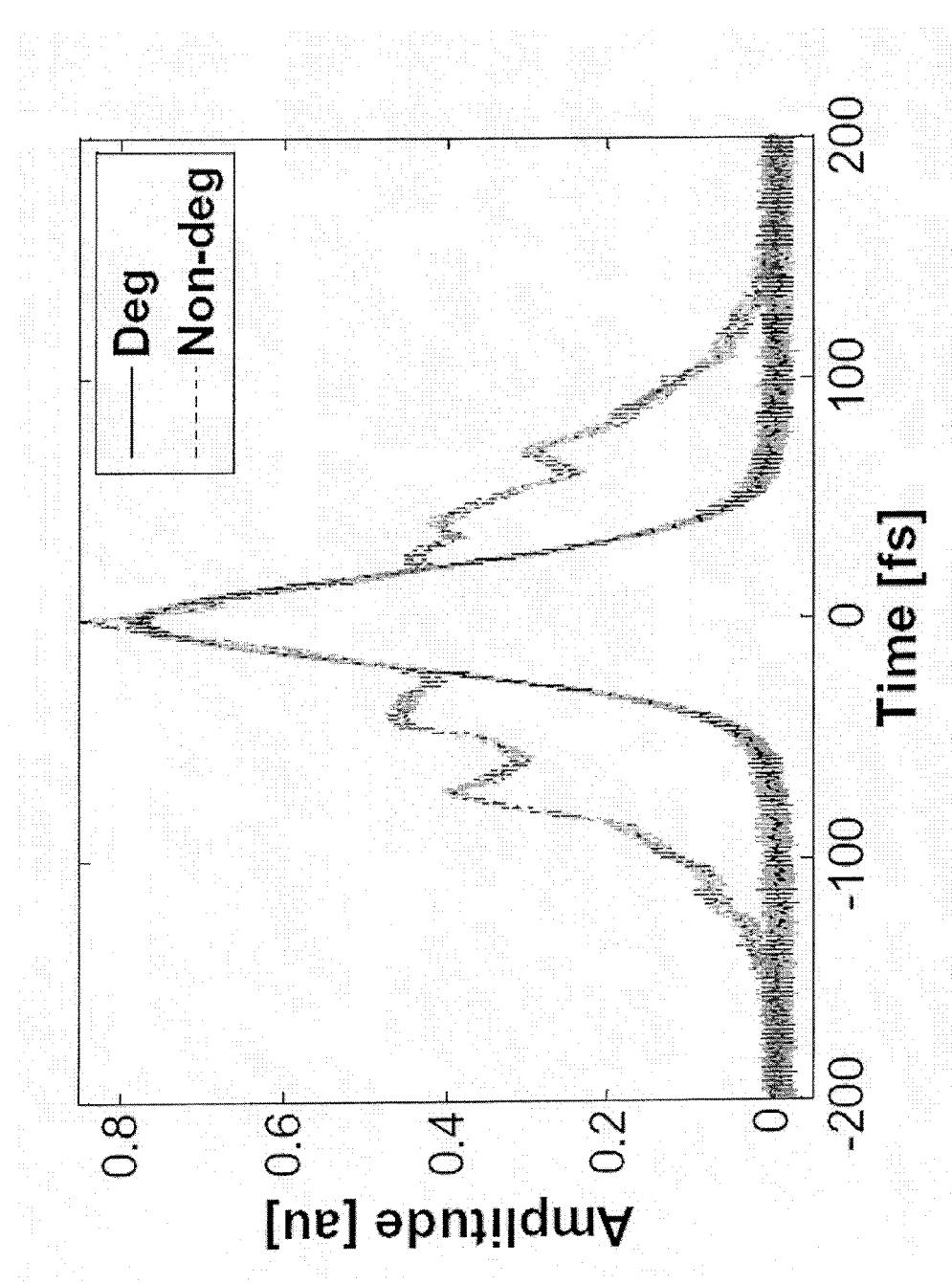
FIG. 7 shows a comparison of autocorrelation traces for degenerate and non-degenerate SPOPOs, consistent with an embodiment of the present disclosure.

FIG. 7 shows a comparison of autocorrelation traces for degenerate and non-degenerate SPOPOs, consistent with an embodiment of the present disclosure. The full width at half maximum pulse duration in the degenerate case was 70 fs, which is close to transform-limited for the measured spectral width and a Gaussian profile. In contrast, the pulse shape for the non-degenerate SPOPO was broader and distorted. When the OPO is not degenerate, there can be arbitrary (and fluctuating) phase relations between the signal and the idler. Without being limited by theory, it is believed that that the observed time-domain distortions could be the explained by the output pulse being formed by both signal and idler waves.

Figure 8:
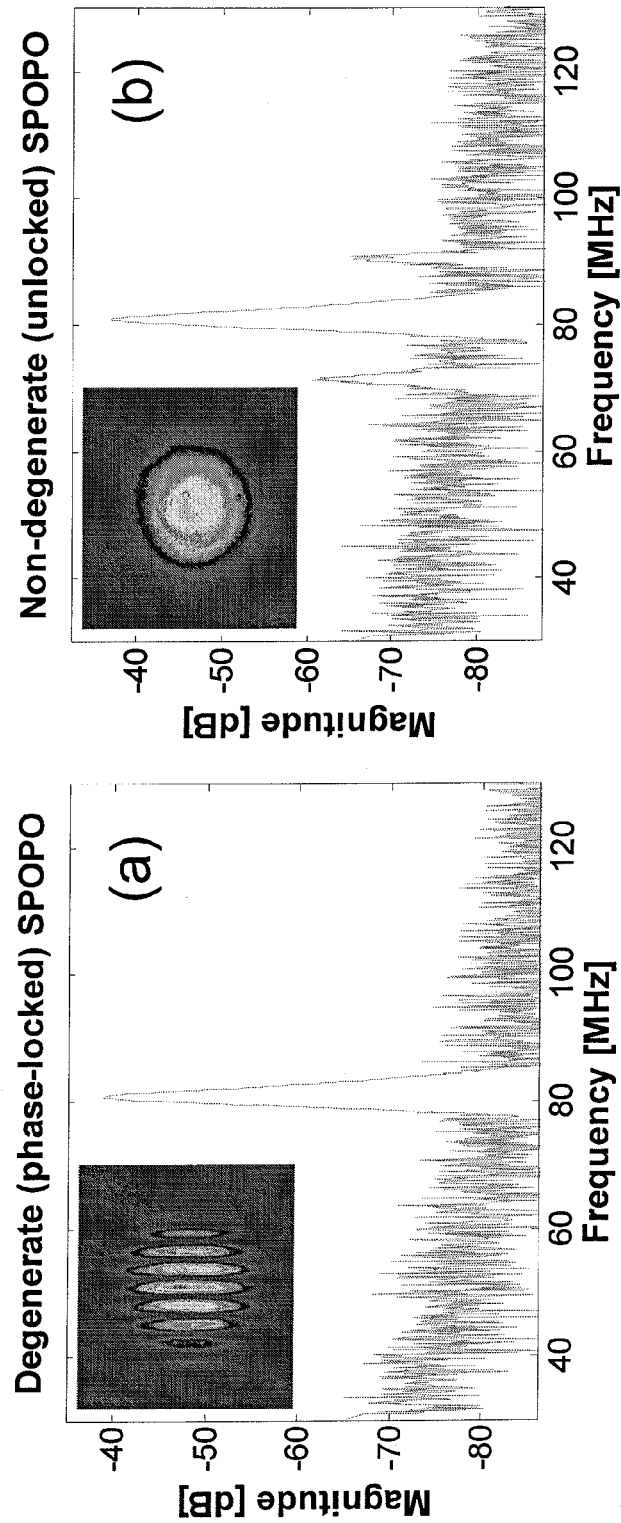
FIG. 8(a) shows experimental results from a degenerate (phase-locked) SPOPO, consistent with an embodiment of the present disclosure.
FIG. 8(b) shows experimental results from a non-degenerate (unlocked) SPOPO, consistent with an embodiment of the present disclosure.
Figure 9:
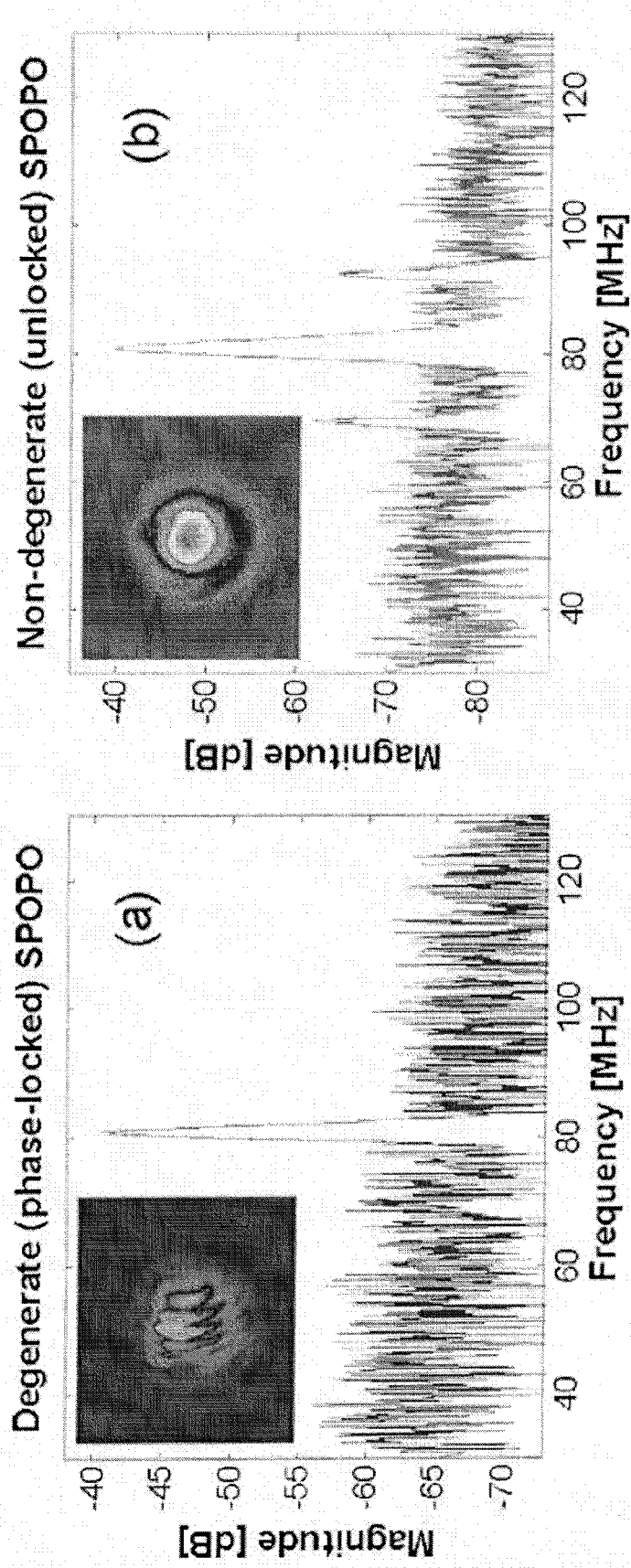
FIG. 9(a) depicts results for degenerate SPOPOs from interference between the pump and the OPO, consistent with an embodiment of the present disclosure.
FIG. 9(b) depicts results for non-degenerate SPOPOs from interference between the pump and the OPO, consistent with an embodiment of the present disclosure.

To measure the phase coherence between the pump and the OPO modes, the second harmonic (SH) of the SPOPO output (produced in a separate PPMgO:LN crystal) was compared with the pump, through small-angle interference patterns and through a radio frequency (RF) beat signal. If the SPOPO is phase-locked, interference between the pump and the frequency-doubled OPO output is expected to yield a stable fringe pattern [note that both solutions (5) and (6) will produce the same SH field]. In addition, when the SPOPO is phase locked, Eqs. (5) and (6) require that the RF spectrum should exhibit only harmonics of $f_{rep}$ with no satellite beat notes. Because the SH crystal also produces, due to intermodal cross mixing, sum frequency generation (SFG) that fully reconstructs the pump, the examined narrow portions of the OPO SH spectrum were examined to avoid most of the SFG background. Various narrowband (typically 3-10 nm wide) filters were placed: (i) after the SH crystal (thus filtering out the OPO SH spectrum) or (ii) before the SH crystal (thus filtering out the fundamental OPO spectrum), and delivered identical results for both fringe pattern and RF spectrum (FIGS. 8 and 9). The results show from interference measurements between the pump and the OPO SH transmitted through a narrowband 750 nm filter. FIG. 8(a) shows experimental results from a degenerate (phase-locked) SPOPO in which the presence of strongly visible fringes and absence of satellite RF beat frequencies can be seen. FIG. 8(b) shows results experimental results from a non-degenerate (un-locked) SPOPO in which there is an absence of fringe pattern and a presence of RF satellite beat notes. FIGS. 9(a) and 9(b) depict results from interference between the pump and the OPO SH using a 1600 nm filter before the SH crystal for (a) degenerate (phase-locked) and (b) non-degenerate (un-locked) SPOPOs. Thus, when the SPOPO was degenerate, a stable fringe pattern persisted with high contrast and no satellite RF beat notes were observed. In contrast, when the SPOPO was non-degenerate, stable fringes disappeared, while RF satellite beat notes emerged.

As another technique to confirm phase locking, an independent laser source (i.e., a single-mode 1550 nm CW laser and its SH) was used as an external phase reference to separately generate beat notes with the pump mode-locked laser and the SPOPO. The CEO frequency of the pump laser $f_{CEO}$ (4) was allowed to fluctuate to observe how the SPOPO would react to an evolving frequency offset of the pump frequency comb. If the SPOPO is degenerate and phase-locked to the pump, the change in the beat note between the SPOPO and the CW laser should be half of the change in the beat note between the pump and the frequency-doubled CW laser. The frequency of the CW laser can be represented as $v_0+kf_{rep}$, where k is some large integer, and the beat note between its SH and the pump laser is $2v_0-f_{CEO}$. On the other hand, according to Eqs. (5) and (6) the beat note between the CW laser and the OPO is either $v_0-f_{CEO}/2$ or $v_0-f_{CEO}/2+f_{rep}/2$ (plus an integer number of $f_{rep}$).

Figure 10:
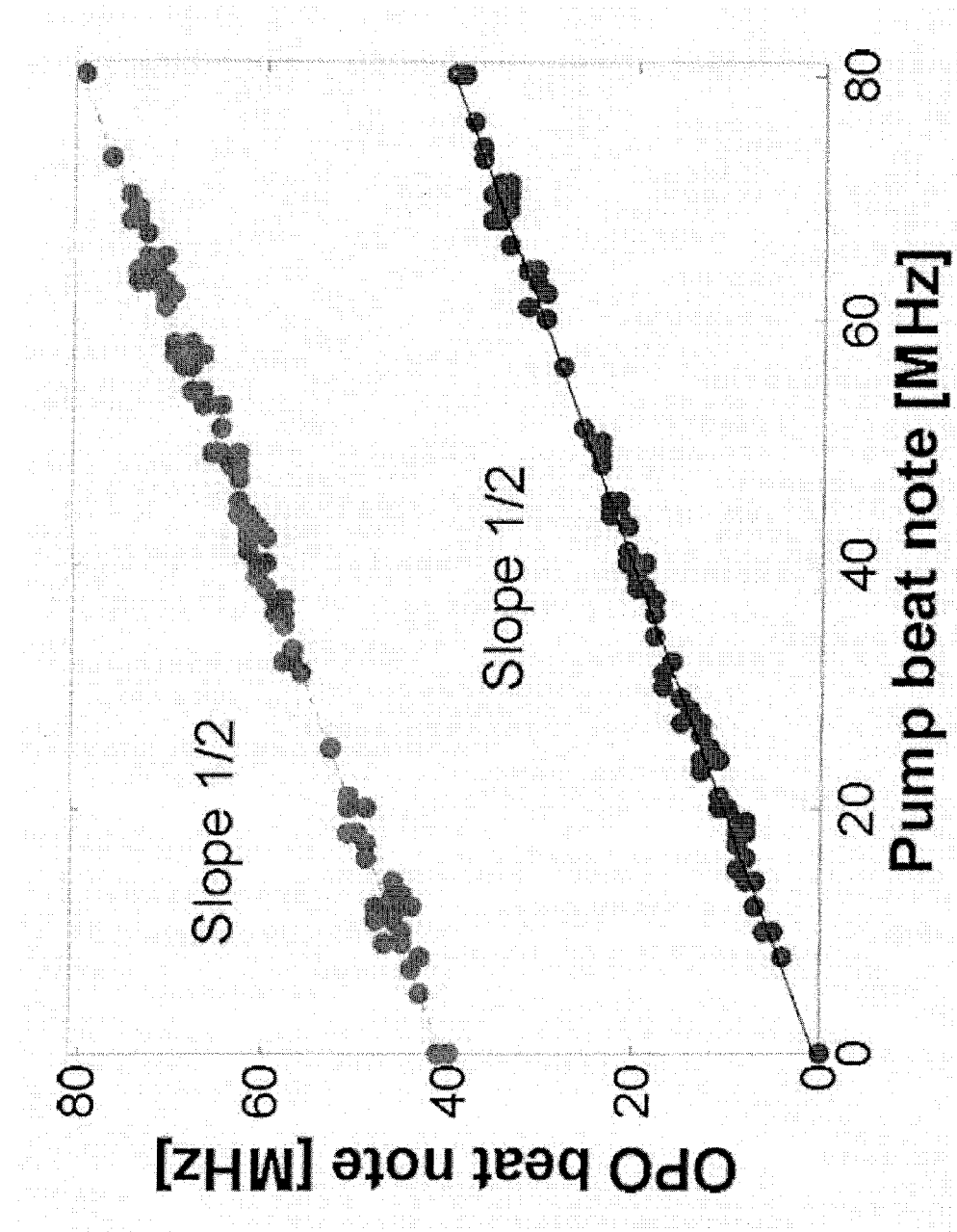
FIG. 10 shows the scatter plot of the SPOPO beat frequency versus the pump beat frequency drift, consistent with an embodiment of the present disclosure.

FIG. 10 shows the scatter plot of the SPOPO beat frequency (within the 80 MHz window) versus the pump beat frequency drift, consistent with an embodiment of the present disclosure. The SPOPO beat notes may jump randomly by 40 MHz ($f_{rep}/2$), after blocking and unblocking the pump beam, which corresponds to the two sets of SPOPO modes, both giving the slope of ½ as expected. This suggests that the degenerate SPOPO automatically tracked $f_{CEO}$ of the drifting pump laser. Thus, for a CEO-stabilized pump, the SPOPO output will also be CEO-stabilized and phase-locked to the pump.

The effect of cavity-length detuning was measured for the SPOPO in the phase-locked state by dithering a highly reflective end mirror with a piezoelectric transducer (FIG. 5) while detecting the SPOPO output using a photodetector. The maximum length detuning $\Delta L$, before the oscillation ceases, is related to the frequency locking range $\Delta f$ via the relation $\Delta f/f_{rep}=\Delta L/(\lambda/2)$, where $\lambda=1550$ nm is the central SPOPO wavelength.

Figure 11:
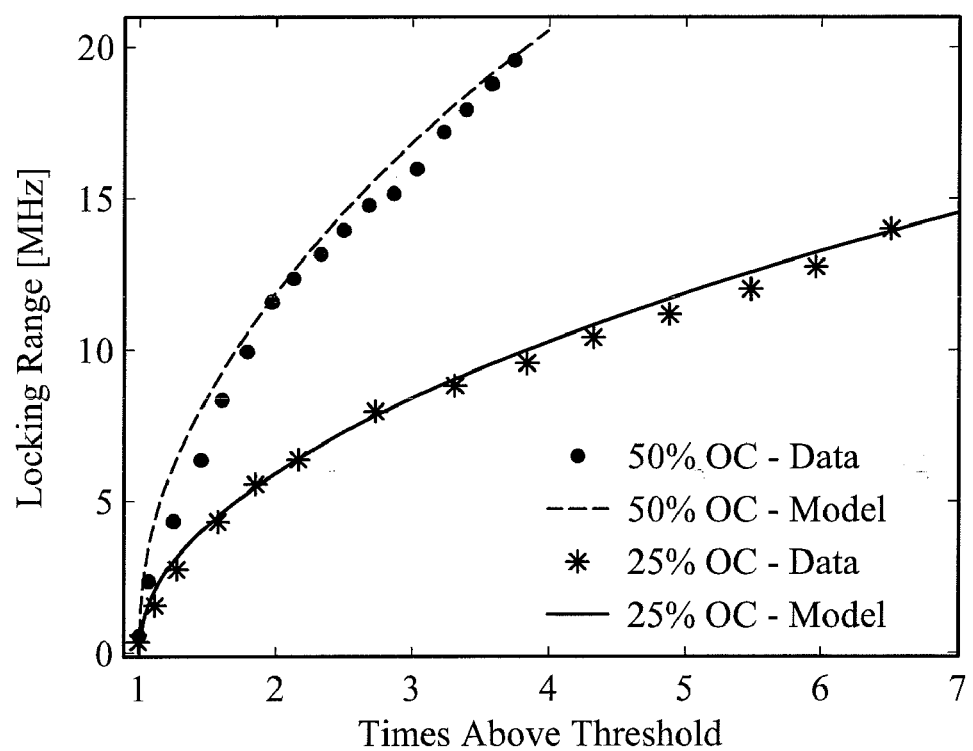
FIG. 11 represents the locking range $\Delta f$ measured as a function of times above threshold for two different out coupler (OC) mirrors, consistent with an embodiment of the present disclosure.

FIG. 11 represents the locking range $\Delta f$ measured as a function of times above threshold for two different outcoupler (OC) mirrors of 50% and 25%, where it can be seen that the locking range monotonically increases with the pump power. The lines represent predictions of a theoretical model and show a good match between experiment and theory. For the same number of times above threshold, the 50% output coupling yielded a broader detuning range compared to the 25% output coupler, again in agreement with theory.

The average output power of the degenerate SPOPO with the 50% OC mirror was 250 mW at 900 mW of the average pump power. The pump threshold was 140 mW, the slope efficiency was 32%, and the pump depletion exceeded 60%. For the 25% OC, the pump threshold was 35 mW.

The mode-locked pump laser was free-running (no CEO stabilization applied) and no feedback servo loop was needed for the SPOPO to maintain oscillation (the only measures used against environmental noise were a floated optical table and an enclosure built around the SPOPO). Despite the lack of active stabilization, the phase-locked operation of the SPOPO persisted even in the presence of intentional perturbations (e.g., tapping on the enclosure). Without being bound by theory, it is believed that, due to the physical mechanism for the phase-locked operation, it can be useful for the signal and the idler modes to follow exactly the same frequency grid (e.g., to provide a large parametric gain). Since the signal and the idler become indistinguishable, deterministic phase relation between the pump and the OPO modes is established through Eq. (7).

Various embodiments relate to implementing desired spectral ranges and bandwidths of the frequency comb, e.g., by extending the phase-matching gain bandwidth by using shorter nonlinear crystals and also by precise cavity dispersion control using chirped dielectric mirrors.

Figure 12:
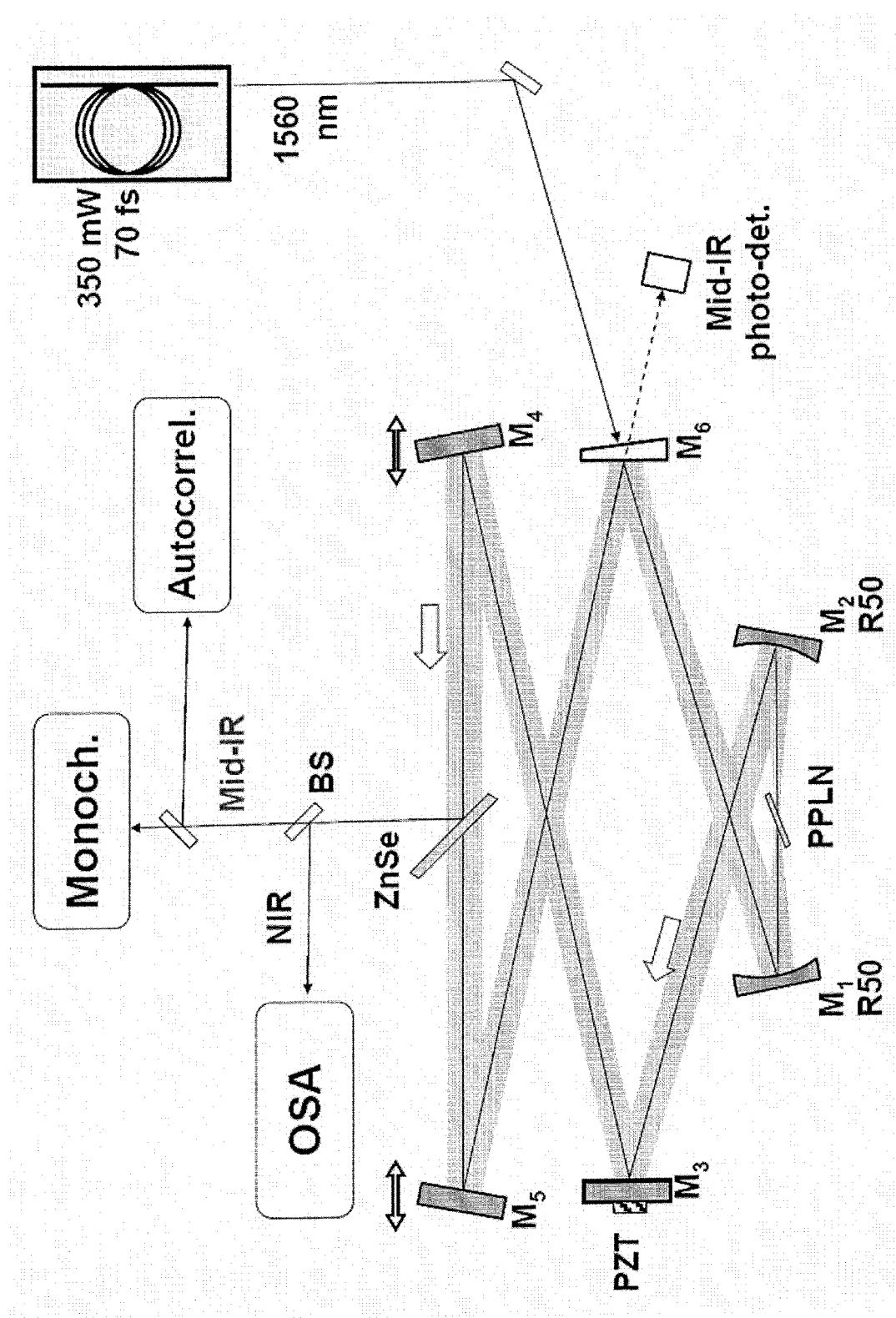
FIG. 12 depicts an experimental system using a degenerate divide-by-2 optical parametric oscillator, consistent with an embodiment of the present disclosure.

FIG. 12 depicts an experimental system using a degenerate divide-by-2 optical parametric oscillator, consistent with an embodiment of the present disclosure. The system pumps a ring-cavity OPO using a C-Fiber Er-doped femtosecond laser from Menlo Systems (1560 nm, 100 MHz, 70 fs, 350 mW). The system uses a pair of concave mirrors (M1, M2) with R=50 mm and four flat mirrors (M3-M6). The mirrors M1-M5 can be gold coated with >99% reflection at 3 μm; the pump coupling mirror M6 is dielectric, on a wedged)(2°) YAG substrate, with T=75% for the pump and R>99% in the 2.8-4 μm range. The gain medium is periodically poled lithium niobate (MgO:PPLN) crystal from Crystal Technology Inc., 1-mm-long, with a QPM period of 34.8 μm, kept at t=32° C., and designed for type 0 (e=e+e) subharmonic generation from 1560 nm. The gain medium is cut at Brewster angle in such a way that the beam k-vector inside the crystal is perpendicular to the inverted domain boundaries. A 3.3-mm ZnSe plate at ~45° angle of incidence was used for the 2nd-order group velocity dispersion compensation and also as an OPO beam out coupler. The doubly-resonant condition was achieved by fine-tuning the cavity length with a piezo actuator attached to one of the mirrors. The OPO threshold was measured to be <50 mW.

Experimental results have indicated that even without optimization of the output coupling, the OPO produces 45 mW of average power centered at 3.1 μm. The OPO spectrum was measured by (i) a grating monochromator and (ii) by mixing the OPO output with the pump and examining their sum frequency signal with an optical spectrum analyzer (OSA). While it is possible that the monochromator spectrum was affected by the atmospheric absorption (total path ~3 m), the spectrum obtained by up-conversion was more than 1000-nm-wide (>1000 cm−1) at 20-db level.

Consistent with various embodiments of the present disclosure, intracavity dispersion management and mirror design can be used to further extend the spectral width (e.g., at least one octave).

Figure 13:
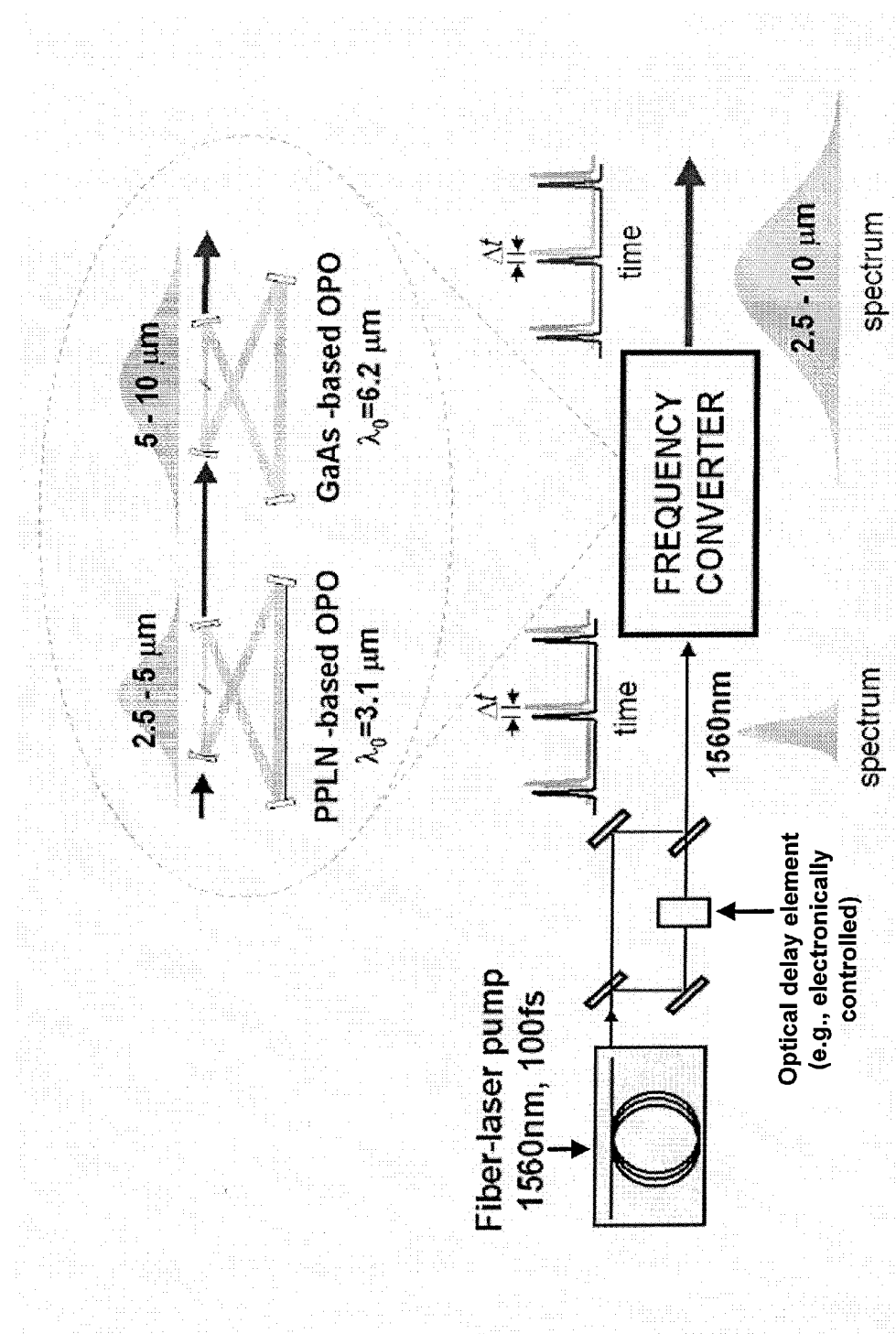
FIG. 13 depicts a system using a cascaded subharmonic OPO and an optical delay element for generating an offset between two beams, consistent with an embodiment of the present disclosure.

FIG. 13 depicts a system using on a cascaded subharmonic OPO and an optical delay element for generating an offset between two beams, consistent with an embodiment of the present disclosure. The output of the laser source (e.g., 1560 nm pump-fiber laser) is split into two beams and sent along two different paths. At least one of the paths includes a controllable optical delay element. The beams are then recombined and used as a pump for the cascaded subharmonic OPO. By varying the delay of the paths relative to one another, an offset between the beams can be varied. This results in a variable offset Δt. The resulting signal from the OPO represents the interference between the two beams with the maximum response occurring when Δt is zero ('coherence peak') and the absorption spectrum will be retrieved from this interferogram via fast Fourier transform (FFT) procedure. The coherent nature of the frequency comb source is particularly useful for providing an output with sufficient brightness for a variety of different applications including, but not limited to chemical identification at considerable distances. The use of a special temporal format of frequency combs created by electronically-controlled optical delay can also be particularly useful because these aspects do not require moving parts and thus can take spectra at high speeds and perform interferometric detection with high speeds (e.g., on the order of 1000 spectra/sec or more). Accordingly, a signal from the system represents the interference between the two "sliding" through each other's pulse trains.

Consistent with one embodiment of the present disclosure, the absorption spectrum is retrieved by recovering the spectrum, encoded in a time-domain signal from the detector, via FFT procedure. Particular implementations allow for this to be accomplished in real time, with a speed of >1000 spectra per second.

Consistent with various embodiments of the present disclosure, a mid-infrared molecular spectrum is matched against known spectra (e.g., from a spectral library) for reliable target identification. The positive identification of an explosive chemical can thereby be conditioned upon the detected spectrum matching a library spectrum over a super-wide spectral range of 3000 cm$^{-1}$. This can be useful for providing a probability of false identification (false positive) that is relatively low.

Mid-IR Frequency comb source spanning 2.5-10 μm based on a cascaded subharmonic OPO (Frequency Converter) pumped by an ultrafast fiber laser. The inset shows first (PPLN-based) and second (GaAs-based) OPO stages. The "time" diagrams show the input and output of the Frequency Converter in the time domain (Δt is a variable delay time), and the "spectrum" diagrams—in the frequency domain.

As discussed above, specific applications and background details relative to the present disclosure are discussed above, in the description below and throughout the references cited herein. Example applications include an efficient compact room temperature mid-IR source for precise metrology and/or ultrasensitive molecular detection, such as for human breath analysis and sensing of hazardous materials. For further details regarding embodiments, experimental results and variations thereof, reference can be made to *Self-Phase-Locked Divide-By-2 Optical Parametric Oscillator As A Broadband Frequency Comb Source*, Samuel T. Wong et al., J. Opt. Soc. Am. B/Vol. 27, No. 5/May 2010; *Self-Phase-Locked Degenerate Femtosecond Optical Parametric Oscillator*, Samuel T. Wong et al., OPTICS LETTERS/Vol. 33, No. 16/Aug. 15, 2008, and to the U.S. Provisional Patent Application Ser. No. 61/233,367 filed on Aug. 12, 2009, and entitled "Infrared Frequency Comb Methods, Arrangements and Applications;" which includes the Appendices A-B. Each of these documents is fully incorporated herein by reference.

Aspects of the present disclosure relate to various frequency comb-based devices and applications thereof. It will be understood by those skilled in the relevant art that the above-described implementations are merely exemplary, and many changes can be made without departing from the true spirit and scope of the present disclosure.

What is claimed is:

1. An apparatus for producing broad-bandwidth frequency combs in the near-infrared and mid-infrared frequency ranges, the apparatus comprising:
    a pump laser configured to produce femtosecond pulses of light having a pulse repetition rate; and
    an optical parametric oscillator (OPO) resonator that is coupled to the pump laser and that has a length configured to facilitate synchronous OPO pumping by matching a roundtrip time of the pulses of light within the OPO resonator with the pulse repetition rate of the pump laser, the OPO resonator including;
        a nonlinear optical gain element inside the OPO resonator, the nonlinear optical gain element configured to provide broad-bandwidth parametric amplification; and
        a set of optical elements configured to direct the pulses of light from the femtosecond pump laser to the nonlinear optical gain element and to direct subharmonic frequencies of the light out of the OPO resonator to produce the broad-bandwidth, 1000-nm-wide at 20-db level, frequency combs.

2. The apparatus of claim 1, wherein the OPO resonator includes optical mirrors having a reflectivity range of at least an octave.

3. The apparatus of claim 1, wherein the set of optical elements includes mirrors arranged to compensate for group-velocity dispersion caused by the nonlinear optical gain element.

4. The apparatus of claim 1, wherein the nonlinear optical gain element is designed to produce optical parametric gain at degeneracy, at twice the wavelength of the pump laser, and with polarizations of OPO signal waves and OPO idler waves in parallel to each other.

5. The apparatus of claim 1, wherein the nonlinear optical gain element includes a periodically-poled oxide-based nonlinear optical crystal that is configured to provide quasi phase matching.

6. The apparatus of claim 1, wherein the nonlinear optical gain element includes a semiconductor-based nonlinear optical crystal that is configured to provide quasi phase matching.

7. The apparatus of claim 1, wherein the nonlinear optical gain element is configured to provide angle-tuned phase matching.

8. The apparatus of claim 1, wherein the nonlinear optical gain element is 10-500 microns long and configured to increase an optical parametric oscillator acceptance bandwidth near degeneracy and to reduce the effects of group velocity dispersion.

9. The apparatus of claim 1, wherein the nonlinear optical gain element has the length that is less than a phase matching coherence length.

10. The apparatus of claim 1, wherein the nonlinear optical gain element is configured to increase an optical parametric oscillator acceptance bandwidth by providing minimal group velocity dispersion (GVD) at near twice a pump laser wavelength.

11. The apparatus of claim 1, wherein a group velocity dispersion (GVD) inside the OPO resonator is compensated for by one or more of a prism, a plurality of optical materials with opposite signs of GVD, and chirped mirrors.

12. The apparatus of claim 1, wherein the OPO resonator further includes a piezoelectric device and an electronic servo loop configured to adjust the length of the OPO resonator to stabilize the device in a doubly resonant condition.

13. The apparatus of claim 1, wherein the apparatus is configured to produce a phase-locked frequency comb spanning from 1.5 microns to 3 microns, from 2.5 microns to 5 microns and from 3 microns to 6 microns.

14. The apparatus of claim 1, wherein the apparatus is configured to produce a phase-locked frequency comb from 3 microns to 6 microns, from 5 microns to 10 microns, and from 6 microns to 12 microns.

15. The apparatus of claim 1, wherein the apparatus is configured to provide phase-locking between modes of the femtosecond pump laser and subharmonic frequencies of the light directed out of the OPO resonator.

16. The apparatus of claim 1, wherein the apparatus is configured to provide all-optical self-phase-locking between the femtosecond laser and the subharmonic frequencies of the light directed out of the OPO resonator.

17. The apparatus of claim 1, wherein the apparatus is configured for use in one or more of: atmospheric measurement to expose physical, chemical and geological processes on Earth; medical breath analysis; detection of hazardous material; pollution detection; atmospheric monitoring; and climate-change analysis.

18. The apparatus of claim 1, further including another second OPO resonator optically cascaded with the first OPO resonator to use the directed subharmonic frequencies of the light from the first OPO resonator as a pump source.

19. A method of using a phase-locked frequency comb source device having a pump laser, comprising the steps of:
producing, using the pump laser, femtosecond pulses of light having a pulse repetition rate;
providing broad-bandwidth parametric amplification at degeneracy by directing the femtosecond pulses of light to a nonlinear optical gain element that is within an optical parametric oscillator (OPO) resonator;
directing the femtosecond pulses of light within light in the OPO resonator, using a set of optical elements, to match a roundtrip time of the pulses of light within the OPO resonator and the pulse repetition rate of the pump laser; and
directing, using the set of optical elements, subharmonic frequencies of the pulses of light out of the OPO resonator.

20. The method of claim 19, further including using optical elements to compensate for group-velocity dispersion caused by the nonlinear optical element and to move an eigenmode beam size inside the nonlinear optical gain element closer to confocal with the nonlinear optical gain element.

21. The method of claim 19, wherein the nonlinear optical gain element includes one of a periodically-poled lithium niobate (PPLN) crystal, a periodically-poled lithium tantalate (PPLT) crystal, a periodically-poled potassium titanyl phosphate (PPKTP) crystal, a periodically-poled potassium titanyl arsenate (PPKTA) crystal, a periodically-poled rubidium titanyl phosphate (PPRTP) crystal and a periodically-poled rubidium titanyl arsenate (PPRTA) crystal.

22. The method of claim 19, wherein the nonlinear optical gain element uses quasi phase matching and is either a periodically-inverted gallium arsenide (GaAs) crystal; a periodically-inverted gallium nitride (GaN) crystal; periodically-inverted gallium phosphide (GaP) crystal; periodically-inverted zinc selenide (ZnSe) crystal; periodically-inverted zinc sulfide (ZnS) crystal, or other semiconductor-based nonlinear optical crystals.

23. The method of claim 19, wherein the nonlinear optical gain element uses angle-tuned phase matching and is either a silver gallium sulphide (AGS) crystal; silver gallium selenide (AGSe) crystal; zinc germanium phosphide (ZGP) crystal; gallium selenide (GaSe) crystal; cadmium germanium arsenide (CGA) crystal; or cadmium silicon phosphide (CdSiP$_2$) crystal.

24. The method of claim 19, further including using all-optical elements for self-phase-locking between the femtosecond pump laser and the subharmonic frequencies of the light directed out of the OPO resonator.

* * * * *